United States Patent

Cochinwala et al.

[11] Patent Number: 6,130,939
[45] Date of Patent: Oct. 10, 2000

[54] APPARATUS AND METHOD FOR NUMBER PORTABILITY CALL PROCESSING

[75] Inventors: Munir Cochinwala, Basking Ridge, N.J.; Ernest Samuel Cohen, Philadelphia, Pa.

[73] Assignee: Telcordia Technologies, Inc., Morristown, N.J.

[21] Appl. No.: 08/907,599

[22] Filed: Aug. 8, 1997

[51] Int. Cl.[7] .................................................. H04M 7/00
[52] U.S. Cl. ........................................... 379/220; 379/211
[58] Field of Search ..................................... 379/220, 221, 379/207, 219, 229, 230, 242, 211, 210, 201

[56] References Cited

U.S. PATENT DOCUMENTS

| | | | |
|---|---|---|---|
| 5,333,184 | 7/1994 | Doherty et al. | 379/229 |
| 5,473,681 | 12/1995 | Partridge, III | 379/221 |
| 5,515,427 | 5/1996 | Carlsen et al. | 379/207 |
| 5,696,816 | 12/1997 | Sonnenberg | 379/220 |
| 5,699,416 | 12/1997 | Atkins | 379/207 |
| 5,703,939 | 12/1997 | Bushnell | 379/207 |
| 5,771,284 | 6/1998 | Sonnenberg | 379/220 |
| 5,796,813 | 8/1998 | Sonnenberg | 379/220 |

*Primary Examiner*—Scott Wolinsky
*Assistant Examiner*—Benny Q. Tieu
*Attorney, Agent, or Firm*—Joseph Giordano; J. W. Falk

[57] ABSTRACT

An apparatus and method for completing a call between an originating switch and a destination switch in a telecommunications network supporting number portability. The method and apparatus use a ported number list or a routing cache in a network switch or adjunct processor to avoid inefficiencies of QOR and N–1 call processing procedures. The invention includes an originating switch for completing a call between the originating switch and a destination switch, the originating switch including structure for storing a ported number list or routing cache, structure for searching the ported number list or routing cache, and structure for routing a call to the destination switch. The invention also includes an adjunct processor for completing a call between the originating switch and a destination switch, the adjunct processor including structure for storing a ported number list or routing cache, structure for searching the ported number list or routing cache, and structure for providing the originating switch with a route for routing a call to the destination switch.

18 Claims, 6 Drawing Sheets

APPARATUS AND METHOD FOR NUMBER PORTABILITY CALL PROCESSING

BACKGROUND OF THE INVENTION

The present invention relates to number portability (NP) in telecommunication networks, and more particularly to systems and methods for number portability call processing.

Currently, local phone service is provided by a single company, such as a Regional Bell Operating Company (RBOC). These companies basically enjoy a monopoly over local phone service within their regions. Thus, efforts are being made to introduce competition into the local phone market to eliminate the monopolies. Under the current system, however, if customers want to change from one service provider to another, they must also change their phone numbers. This is a serious deterrent to switching service providers and, thus, a hindrance to free and open competition.

To alleviate the problem, the Federal Communications Commission (FCC) has issued an order for NP which, in addition to providing other features, will allow a customer to switch between local service providers while keeping the same phone number.

The public telephone network consists of a large number of switches, such as Lucent Technologies' 5ESS, each serving about 10k–100k customers. When a customer dials a number, the customer's serving switch (the originating switch) must allocate a route to the switch serving the dialed number (the destination/provider switch). In the existing pre-NP telephone network, the first six digits (NPA-NXX) of a 10 digit phone number identify a particular switch in a particular geographic region. Switches can route calls between switches based on the NPA-NXX of the dialed number. In an NP environment, however, this relationship between the NPA-NXX and the physical location of a switch is broken, such that there is no fixed relationship between a dialed number and its geographic location.

Current proposals for NP involve storing an identifier corresponding to the switch to which a subscriber's service has been ported in large, special purpose computers, known as service control points (SCP). A simple way to implement NP is for a switch to simply query an SCP for a routing address on every interswitch call, a procedure known as "N–1." However, since most numbers are unported, i.e., most customers stay with one provider, N–1 results in many unnecessary SCP queries. An alternative procedure is to first route the call to the dialed subscriber's original provider switch. If the dialed subscriber's number has been ported, the original provider switch releases the call (i.e., the original provider switch sends a release message to the originating switch). The originating switch then queries the SCP to find out the identifier of the switch providing service to the ported, dialed subscriber. This procedure is called Query-on-Release (QOR). Both the N–1 and QOR procedures suffer from inefficient use of network resources when used to provide number portability.

Figure 1:
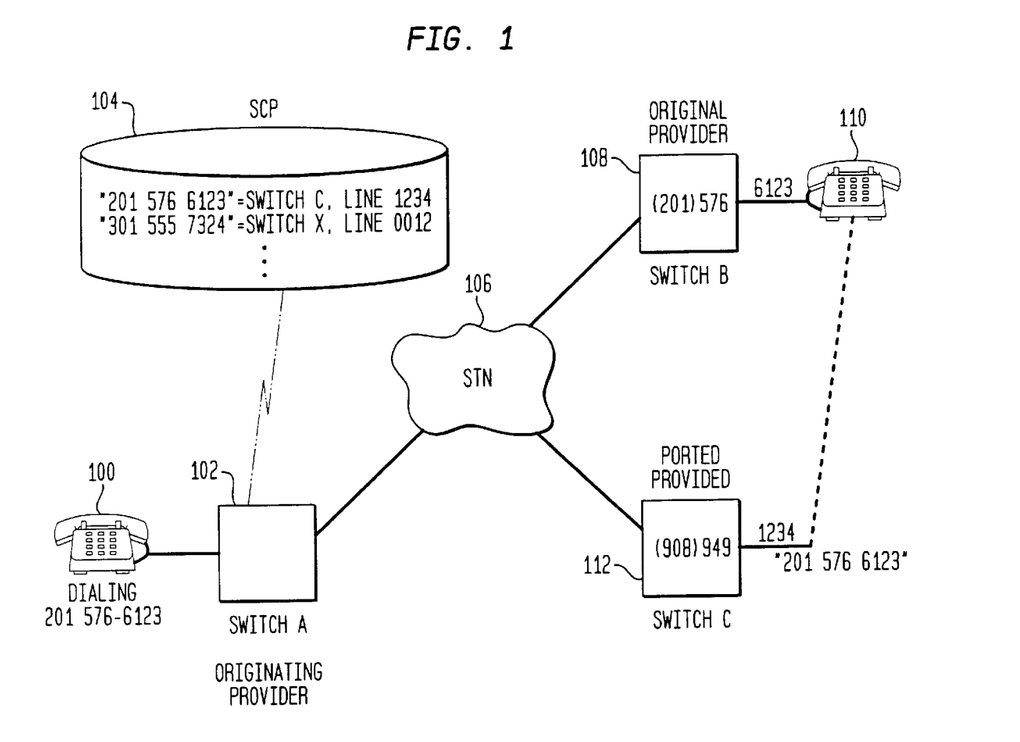
FIG. 1 is a block diagram of a telecommunication network supporting number portability.

The present invention can be implemented in a variety of telecommunication networks including, for example, a telephone network as depicted in the block diagram of FIG. 1. As shown in FIG. 1, a telephone network typically includes a plurality of switches A, B, and C connected by switched telecommunications network (STN) 106. For purposes of this description, these switches are designated as originating provider switch A 102, original provider switch B 108, and ported provider switch C 112. Each switch supports numerous subscribers such as telephone service subscribers 100 and 110. In a typical call flow in such a network, subscriber 100 dials a destination telephone number corresponding to subscriber 110; for example, 201-576-6123. Processing this call according to the QOR procedure, switch A 102 routes the call through STN 106 according to the NPA-NXX of the dialed number, i.e., 201-576, to original provider switch B 108 without first querying SCP 104 for a routing translation of the dialed number. The last four digits of the dialed number, i.e., 6123, identifies a specific telephone line number of Switch B 108. Note that there are also switches that support greater than 10,000 phone numbers. Switch B 108 connects the incoming call to line 6123, thus completing the call to subscriber 110.

Number portability means that subscriber 100 will not need to use a new telephone number to call subscriber 110 if subscriber 110 changes service providers or relocates to an area served by a different switch owned by their current provider. In other words, once a provider assigns a telephone number to subscriber 110, this number remains the subscriber's telephone number regardless of the company providing telephone service to the subscriber or geographic location of the switch actually serving the subscriber. Once subscriber 110 changes from service provided by a telephone company owning switch B 108 to a company owning switch C 112, the company owning switch C 112 is known as a "ported provider" and the telephone number of subscriber 110, which remains the same, is a "ported number." In the example depicted in the block diagram of FIG. 1, ported subscriber 110 receives telephone service from line 1234 of switch C 112. The ported number represents a virtual address of the switch providing service and cannot be used to route calls without translation to obtain the identifier of the switch actually providing service to "ported subscriber" 110.

The difference between routing calls using the N–1 call processing procedure and the QOR call processing procedure is a matter of timing. Specifically, N–1 and QOR are distinguishable by considering the timing of when ported number translation occurs. Under QOR the originating provider processes every number dialed by subscriber 100 as if the number were not ported and attempts to route the call to switch B 108 having switch identifier 201-576. However, if subscriber 110's service is ported to switch C 112, original provider switch B 108 will release the incoming call. Upon receiving a signal from switch B 108 that the attempted call to subscriber 110 through switch B 108 was released, originating provider switch A 102 queries a routing translation database in SCP 104 for a translation of the dialed number to obtain the identifier of the ported provider switch. SCP 104 translates the dialed ported number 201-576-6123 to a route corresponding to switch C, line 1234. Accordingly, the call is properly routed to ported subscriber 110 through ported provider switch C, thus completing the call.

In contrast to QOR call processing, a switch executing the N–1 procedure assumes each dialed number is a ported number and requests a translation of the dialed number from the SCP before attempting to complete the call. Overall, the QOR procedure is inefficient because it attempts to complete calls to switches that no longer provide service to a particular subscriber. The N–1 procedure is inefficient because the originating switch queries the SCP for numbers that have not been ported.

Accordingly, it is an object of the invention to improve the efficiency and effectiveness of NP call processing procedures.

DESCRIPTION OF THE INVENTION

To achieve these and other advantages and in accordance with the purposes of the invention, as embodied and broadly described, the invention includes an efficient method for providing number portability. The method includes the steps, executed by a switch call processor, of searching a ported number list or routing cache and routing a call to the destination switch.

The invention also comprises an originating switch for completing a call between the originating switch and a destination switch, the originating switch including structure for storing a ported number list or routing cache, structure for searching the ported number list or routing cache, and structure for routing a call to the destination switch.

The invention also comprises an adjunct processor for completing a call between the originating switch and a destination switch, the adjunct processor including structure for storing a ported number list or routing cache, structure for searching the ported number list or routing cache, and structure for providing the originating switch with a route for routing a call to the destination switch.

It is to be understood that both the foregoing general description and the following detailed description are exemplary and explanatory and are intended to provide further explanation of the invention as claimed.

BRIEF DESCRIPTION OF THE DRAWINGS

The accompanying drawings provide a further understanding of the invention. They illustrate embodiments of the invention and, together with the description, explain the principles of the invention.

BEST MODE FOR CARRYING OUT THE INVENTION

Reference will now be made in detail to the construction and operation of preferred implementations of the present invention which are illustrated in the accompanying drawings.

The following description of the preferred implementations of the present invention is only exemplary of the invention. The present invention is not limited to these implementations, but may be realized by other implementations.

Figure 2:
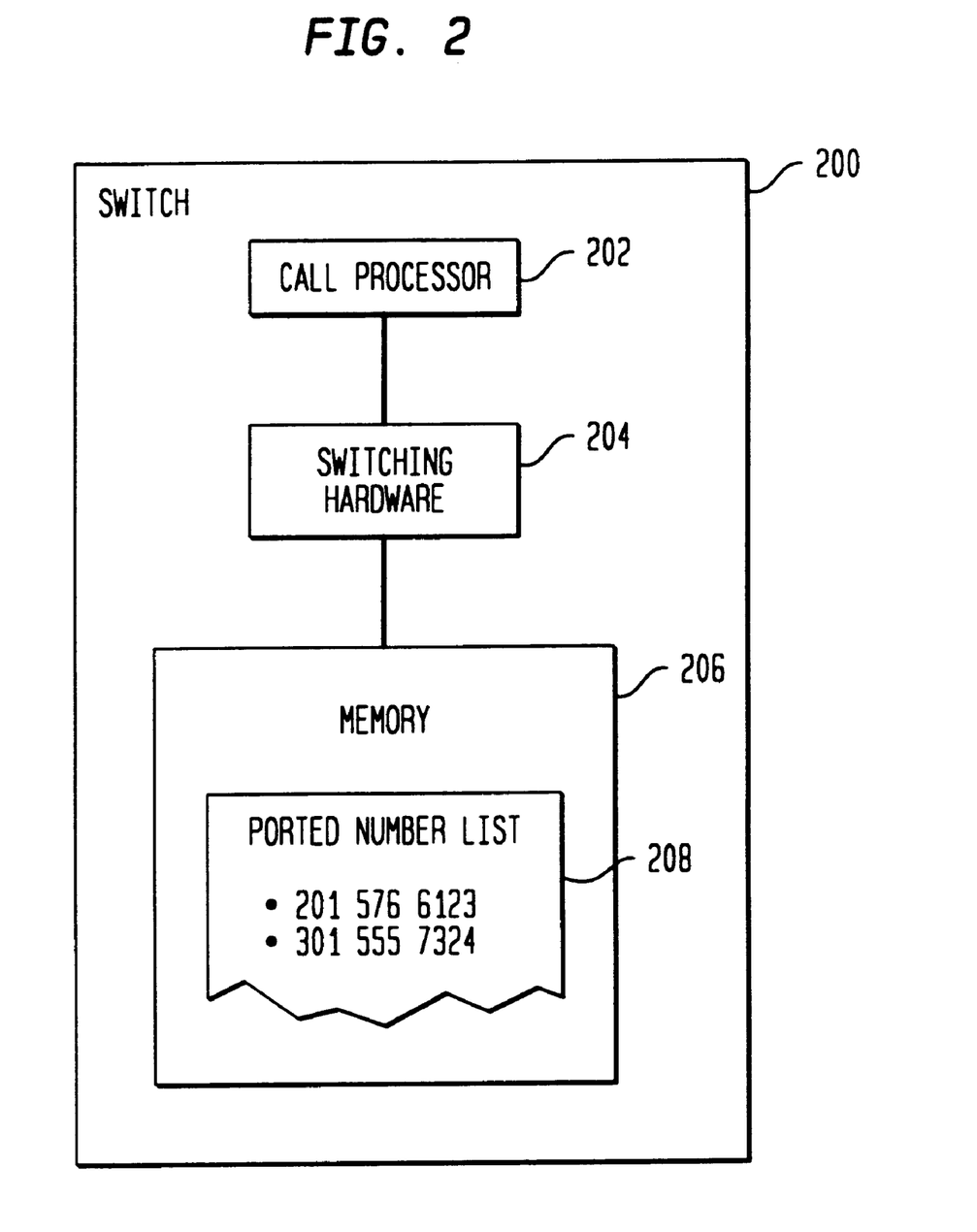
FIG. 2 is a block diagram of an originating switch in accordance with one embodiment of the present invention.

An embodiment of the apparatus of the present invention shown in the block diagram of FIG. 2 provides call processing capability supporting number portability that improves upon the N–1 and QOR techniques. The apparatus of FIG. 2 includes telecommunications switch 200, which includes call processor 202, switching hardware 204, and memory 206. Memory 206 stores ported number list 208; ported number list 208 contains the set of numbers dialed by subscribers served by switch 200 that correspond to ported numbers. Instead of processing every number dialed by subscriber 100 using either the QOR procedure alone or the N–1 procedure alone, switch 200 processes calls using ported number list 208 in a manner combining QOR and N–1 procedures described in greater detail below.

Figure 3:
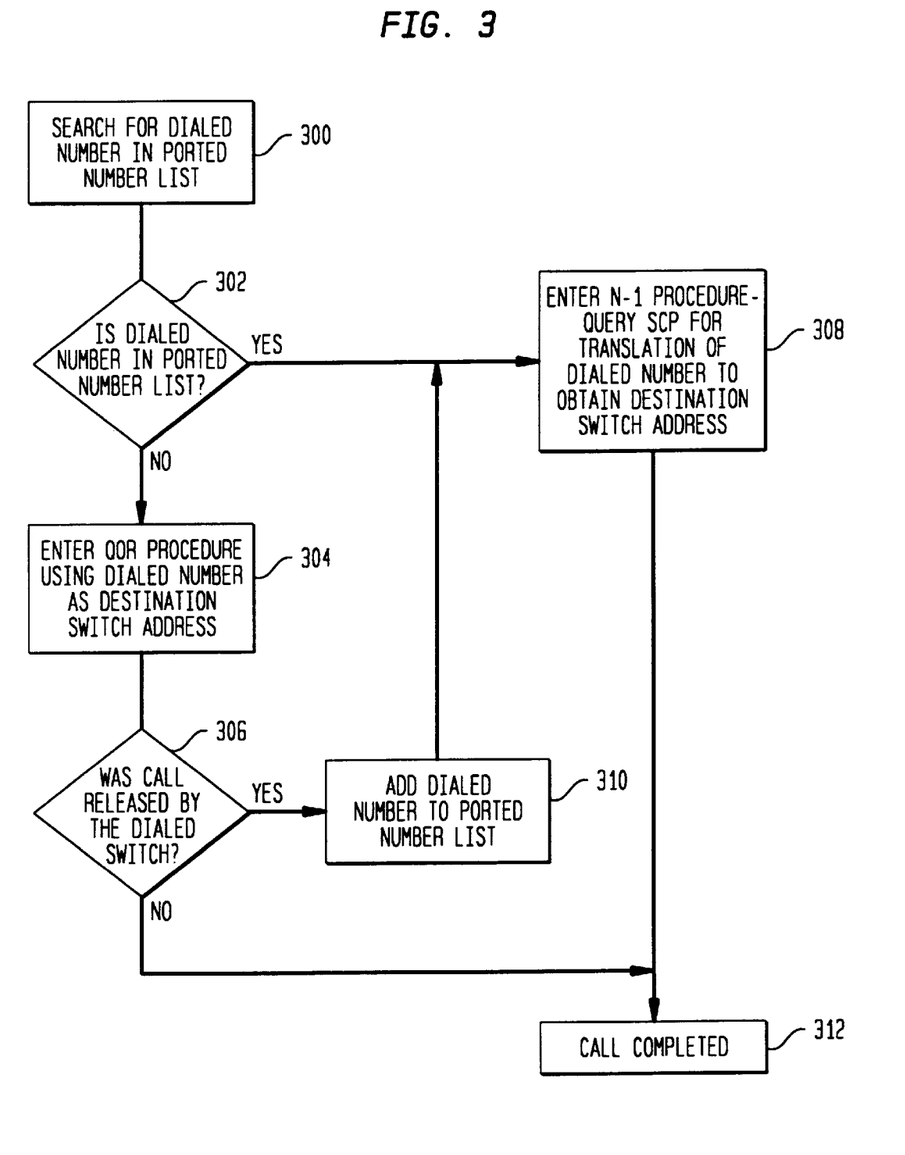
FIG. 3 is a process flow diagram of a method for completing a call between an originating switch and a destination switch in accordance with one embodiment of the present invention.

In accordance with the present invention, switch 200 in a telecommunications network performs several tasks as illustrated by the process flow diagram of FIG. 3. Preferably, switch 200 searches ported number list 208 stored in switch memory 206 for the number dialed by a subscriber (step 300). If the dialed number is in ported number list 208, call processor 202 enters the N–1 procedure and queries an SCP for translation of the dialed number to obtain the destination switch address (step 308), thus completing the call (step 312). If the dialed number is not represented in the ported number list (step 302), then call processor 202 enters the QOR procedure using the dialed number as the destination switch address (step 304). If the call is released by the dialed switch (step 306), the dialed number is added to ported number list 208 (step 310) and call processor 202 subsequently enters the N–1 procedure and queries an SCP for translation of the dialed number to obtain the destination switch address to complete the call (step 308). If the call is not released by the dialed switch (step 306), the call is subsequently completed to the destination switch address corresponding to the dialed number without translation (step 312).

Figure 4:
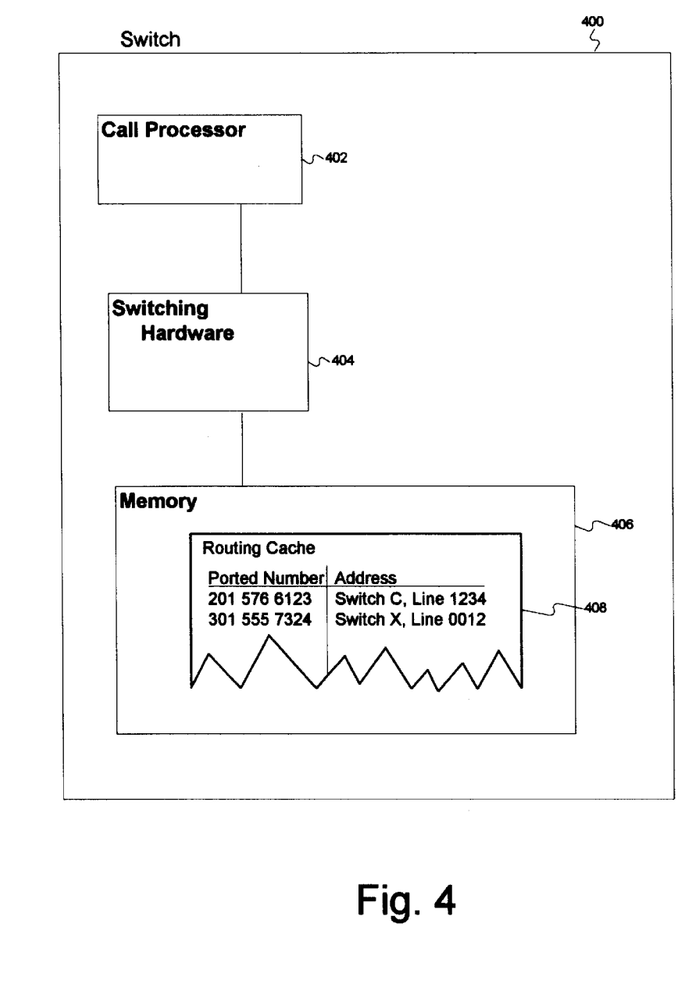
FIG. 4 is a block diagram of an originating switch in accordance with another embodiment of the present invention.

In another embodiment of the apparatus of the present invention, switch 400, shown in the block diagram of FIG. 4, includes call processor 402, switching hardware 404, and memory 406. Routing cache 408, stored in memory 406, contains both a list of ported numbers and the corresponding switch address and line numbers for each of the ported numbers. Call processor 402 of switch 400 executes tasks similar to those outlined in the process flow diagram of FIG. 3 to provide improved local number portability. These tasks are illustrated by the flow diagram of FIG. 5. Preferably, switch 400 searches for the dialed number in routing cache 408 (step 500). If the dialed number is represented in routing cache 408 (step 502), the call is completed to the address specified in the routing cache 408 (step 512).

Figure 5:
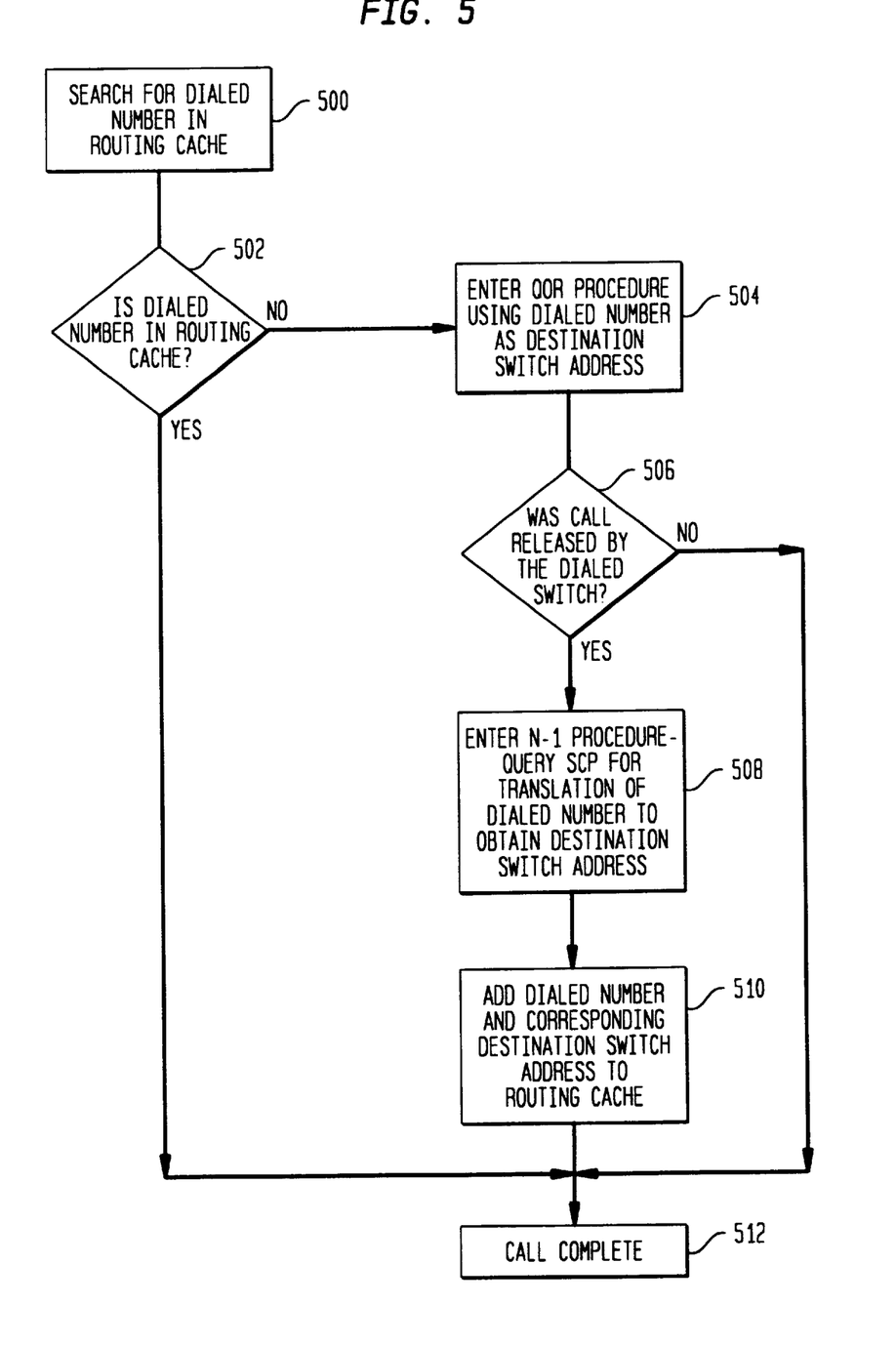
FIG. 5 is a process flow diagram of a method for completing a call between an originating switch and a destination switch in accordance with one embodiment of the present invention.

If the dialed number is not represented in routing cache 408, call processor 402 enters the QOR procedure using the dialed number as the destination switch address (step 504). After entering the QOR procedure, the process then determines whether the call was released by the dialed switch (step 506). If not, the call is completed (step 512). If the dialed switch has released the call, call processor 402 enters the N–1 procedure and queries an SCP for translation of the dialed number to obtain a destination switch address corresponding to the dialed number (step 508). Call processor 408 then adds both the dialed number and the just obtained destination switch address to routing cache 408 (step 510) and completes the call (step 512).

In addition to the tasks outlined above, in another embodiment consistent with the present invention it may also be desirable to delete routing cache entries that provide the call processor with incorrect destination switch addresses. In such an embodiment, call processor 402 deletes an entry in routing cache 408 when a call cannot be completed to a switch identified by an entry in routing cache 408 corresponding to the dialed number. The call processor or adjunct processor creates a new ported number list or routing cache if the ported number list or routing cache gives too many false positives, i.e., the list or cache indicates that an unported number is ported. This new cache or list continues to run in parallel with the old cache or list until the new cache or list has a sufficient set of numbers to route most calls correctly. After which time, the old cache or list is discarded.

In accordance with the present invention, the ported number list and the routing cache may be configured as any conventional memory structure for providing efficient and effective memory look-up operations. For example, both ported number list 208 and routing cache 408 may be represented as a hash table or search tree.

Figure 6:
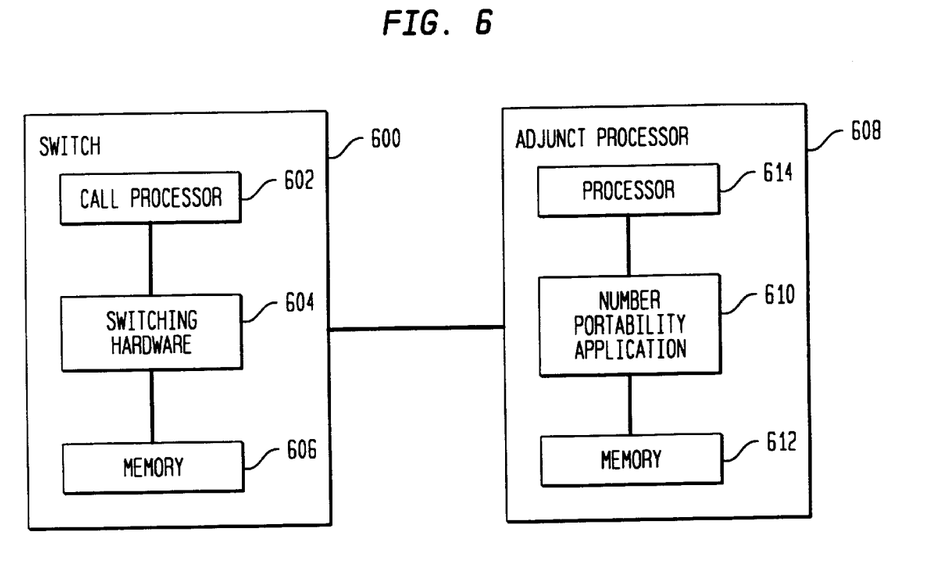
FIG. 6 is a block diagram of an embodiment of an adjunct processor in accordance with one embodiment of the present invention.

In another embodiment of the present invention as shown in the block diagram of FIG. 6, switch 600 cooperates with adjunct processor 608 to route calls. Switch 600 includes call processor 602, switching hardware 604, and memory 606. Adjunct processor 608 includes processor 614, which executes number portability application 610. Number portability application 610 preferably accesses adjunct processor memory 612 to provide routing support to switch 600. To reduce the computational overhead required in a call processor and the amount of switch memory required to support the methods for improving number portability of the present invention, adjunct processor memory 612 preferably includes either a ported number list or a routing cache as previously described. Processor 614 executes number portability application 610 and performs the tasks outlined in the flow diagrams of FIGS. 3 and 5 in cooperation with a switch call processor to route calls.

A benefit of solving problems associated with number portability with methods and apparatuses in accordance with the present invention is illustrated in the following example of typical telecommunications traffic. First, the serving switch of a given number changes relatively slowly. Second, the calls originating from a given switch are to a relatively small set of distinct numbers. Typically, about 99.7% of calls are to numbers that have been called and routed to within the previous week, and the number of distinct numbers called in a given week is less than 10% of the weekly traffic. Accordingly, maintaining a ported number list or cache in accordance with the present invention and storing only a few ported telephone numbers accommodating the majority of calls dialed from a switch can provide tremendous switching efficiencies by eliminating many SCP queries.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. A method for enabling completion of a call to a subscriber who has moved from an original terminating switch to a ported terminating switch comprising the steps of at an originating switch, in response to a dialed number, querying a ported number list to determine if the dialed number is indicated as having been ported from the original terminating switch to the ported terminating switch;

if the dialed number is in said queried ported number list, accessing a routing translation database for a translation of the dialed number;

if the dialed number is not in said queried ported number list, routing the call to the original terminating switch;

if the original terminating switch releases the call back to the original switch, the originating switch accessing the routing translation database for the translation of the dialed number; and using the translation to route the call.

2. The method in accordance with claim 1 further comprising the step of adding a new entry to said queried ported number list if the original terminating switch releases the call.

3. The method in accordance with claim 1 further comprising the step of removing an entry from said queried ported number list when said queried ported number list indicates a non-ported number is ported.

4. The method in accordance with claim 1 wherein said queried ported number list is separate and distinct from the routing translation database, said queried ported number list contains fewer entries than contained in the routing translation database, and said queried ported number list is dynamically maintained by the originating switch.

5. The queried ported number list of claim 4 wherein said queried ported number list contains a list of ported numbers dialed by the subscribers of the originating switch.

6. A method for completing a call between an originating switch and a destination switch based on a dialed number to a prior switch from which a subscriber has moved, said method including the steps of searching a ported number list stored in memory for an entry representing a ported number, said searched ported number list containing less than all of the ported numbers that can be accessed;

routing the call to the prior switch if a dialed number is not represented in said searched ported number list;

if the prior switch releases when the call is routed to it, the originating switch querying a routing translation database separate from the originating switch and containing translations for a larger number of the ported numbers than are stored in said searched ported number list stored in memory; and routing the call to the destination switch based on the translation obtained from the routing translation database.

7. The method in accordance with claim 6 wherein said searched ported number list contains an identification of some of the ported numbers whose translations are contained in the routing translation database, said method further comprising the steps of querying the routing translation database if the dialed number is represented in said searched ported number list stored in memory; and routing the call to the destination switch based on the translation obtained from the routing translation database.

8. The method in accordance with claim 7 further comprising the step of removing an entry from said searched ported number list when said searched ported number list indicates a non-ported number is ported.

9. The method in accordance with claim 6 wherein said searched ported number list contains routing translations for some of the dialed numbers, said method further comprising the step of routing the call to the destination switch based on said routing translation obtained from said searched ported number list if the dialed number is represented in said searched ported number list.

10. The method in accordance with claim 9 further comprising the step of adding the translation obtained from the routing translation database to said searched ported number list if the prior switch releases the call.

11. The method in accordance with claim 9 further comprising the step of removing said routing translation from said searched ported number list when said searched ported number list provides an incorrect routing translation for a call.

12. The method in accordance with claim 6 further comprising the step of adding a new entry to said searched ported number list if the prior switch releases the call.

13. A method for enabling completion of a call to a subscriber who has moved from an original terminating switch to a ported terminating switch comprising the steps of at an originating switch, in response to a dialed number, querying a ported number list to determine if the dialed number is indicated as having been ported from the original terminating switch to the ported terminating switch, said queried ported number list containing routing translations for fewer than all dialed numbers which have been ported from an original terminating switch to a ported terminating switch;

if the dialed number is in said queried ported number list, routing the call to the ported terminating switch;

if the dialed number is not in said queried ported number list, routing the call to the original terminating switch;

if the original terminating switch releases the call, accessing a database distinct from said queried ported number list for a translation of the dialed number; and using the translation to route the call.

14. The method in accordance with claim 13 further comprising the step of adding the translation obtained from the database to said queried ported number list if the original terminating switch releases the call.

15. A method for enabling completion of a call to a subscriber who has moved from an original terminating switch to a ported terminating switch comprising the steps of at an originating switch, in response to a dialed number, querying a routing cache to determine if the dialed number is indicated as having been ported from the original terminating switch to the ported terminating switch;

if the dialed number is in said queried routing cache, routing the call to the destination switch specified by a routing translation obtained from said routing cache;

if the dialed number is not in said queried routing cache, routing the call to the original terminating switch;

if the original terminating switch releases the call back to the originating switch, the originating switch accessing a routing translation database for a translation of the dialed number; and upon accessing the routing translation database when the original terminating switch releases the call, using the translation to route the call.

16. The method in accordance with claim 15 further comprising the step of adding the translation obtained from the routing translation database to said queried routing cache if the original terminating switch releases the call.

17. The method in accordance with claim 15 further comprising the step of removing said routing translation from said queried routing cache when said queried routing cache provides an incorrect routing translation.

18. The method in accordance with claim 15 wherein said queried routing cache is separate and distinct from the routing translation database, said queried routing cache contains fewer said routing translations than contained in the routing translation database, and said queried routing cache is dynamically maintained by the originating switch.

* * * * *